(12) United States Patent
Swiryn (10) Patent No.: US 12,414,545 B1
(45) Date of Patent: Sep. 16, 2025

(54) AUTOMATIC PET SCOOPING AND SEALING SYSTEM

(71) Applicant: Scott Swiryn, Citrus Heights, CA (US)

(72) Inventor: Scott Swiryn, Citrus Heights, CA (US)

( * ) Notice: Subject to any disclaimer, the term of this patent is extended or adjusted under 35 U.S.C. 154(b) by 0 days.

(21) Appl. No.: 18/779,651

(22) Filed: Jul. 22, 2024

(51) Int. Cl.
*A01K 23/00* (2006.01)
*E01H 1/12* (2006.01)

(52) U.S. Cl.
CPC ......... *A01K 23/005* (2013.01); *E01H 1/1206* (2013.01)

(58) Field of Classification Search
CPC ........ A01K 23/005; A01K 23/00; A01K 1/01; E01H 1/1206; E01H 2001/1293
See application file for complete search history.

(56) References Cited

U.S. PATENT DOCUMENTS

| | | | |
|---|---|---|---|
| 3,446,525 A | 5/1969 | Jones | |
| 3,786,780 A | 1/1974 | Pezzino | |
| 4,010,970 A | 3/1977 | Campbell | |
| 6,086,123 A | 7/2000 | Sowinski | |
| 6,186,663 B1 | 2/2001 | Ausnit | |
| 6,854,886 B2 | 2/2005 | Piechocki | |
| 7,448,659 B1 | 11/2008 | Auseklis | |
| 7,854,455 B2 | 12/2010 | Ruscil | |
| 7,992,907 B1 | 8/2011 | DeJesus | |
| 8,292,339 B1 | 10/2012 | Auseklis | |
| 10,851,506 B1 * | 12/2020 | Sabella | E01H 1/1206 |
| 2008/0145268 A1 | 6/2008 | Martin | |
| 2008/0276883 A1 | 11/2008 | Perez Tomas | |
| 2010/0096867 A1 | 4/2010 | Flinn | |
| 2014/0137811 A1 | 5/2014 | Kovarik et al. | |
| 2014/0152033 A1 * | 6/2014 | Wilson | E01H 1/1206 294/1.4 |
| 2015/0042112 A1 | 2/2015 | Briski et al. | |
| 2015/0167264 A1 * | 6/2015 | Naseem | E01H 1/1206 294/1.4 |
| 2015/0230811 A1 | 8/2015 | Kovarik et al. | |
| 2017/0159254 A1 * | 6/2017 | Gordon | A47L 7/0061 |
| 2018/0368370 A1 * | 12/2018 | Lenger | A01K 23/005 |
| 2020/0157753 A1 * | 5/2020 | Patterson | H05B 3/0014 |
| 2023/0058613 A1 * | 2/2023 | Burr | B65F 1/062 |
| 2024/0328102 A1 * | 10/2024 | Zamir Peer | A01K 23/005 |

FOREIGN PATENT DOCUMENTS

| | | | | |
|---|---|---|---|---|
| DE | 102008028593 B4 * | 3/2012 | ........... | E01H 1/1206 |
| KR | 20220013791 A * | 2/2022 | ........... | A01K 23/005 |
| KR | 20230017487 A * | 3/2023 | ........... | E01H 1/1206 |
| KR | 20230057166 A * | 4/2023 | ........... | A01K 23/005 |
| KR | 20230161581 A * | 11/2023 | ........... | A01K 23/005 |
| KR | 20240070833 A * | 5/2024 | ........... | A01K 23/005 |

OTHER PUBLICATIONS

NPL Documents cited in in U.S. Appl. No. 16/947,940.

* cited by examiner

*Primary Examiner* — Peter M Poon
*Assistant Examiner* — Hae Rie Jessica Byun (57) ABSTRACT

A poop scooping system has a handle, a pole, connected to the handle at one end of the pole and a jaws device, connecting to the other end of the pole. The jaws can open and close. A bag dispenser, dispenses bags where the bags can be pulled around an outside surface of jaws. A processor controls the jaws opening and closing, when closed, heat seals the bag in two spaced locations to seal the bag with poop therein and also seals the bag at the front of the jaws.

12 Claims, 9 Drawing Sheets

AUTOMATIC PET SCOOPING AND SEALING SYSTEM

This is a continuation in part of Ser. No. 18/466,444, filed Dec. 13, 2023, the entire contents of which are herewith incorporated by reference.

BACKGROUND

Picking up dog excrement is important for many reasons, including cleanliness, reduction of smells, parasites, and bacteria. Many towns and neighborhoods have mandated that users must pick up after their dogs.

A simple way of picking up dog poop is to use a plastic bag which is turned inside out and used like a glove to scoop the poop so that the poop sits inside the bag once the bag is turned inside out.

My other U.S. Pat. No. 10,787,778-B1 and publication US-20210032824-A1 describe a pet poop scooper device which can be used to manually obtain the poop from the ground, and bag the poop while keeping the outside surface of the bag clean.

SUMMARY

The inventor recognized that current systems have limitations, and specifically advantages of an electronic version of an excrement or "poop" bagger, including its ability to automate some or all of the movements and actions needed to pick up pet poop, and bag and seal the poop.

The present application describes an advancement of this using special kinds of technology to isolate the poop, put the poop in a bag, close the bag, seal the bag, and allow the operator to dispense new bags, all while maintaining cleanliness of the tool itself.

An embodiment describes a double seal system which even further makes sure that the sealed bag has poop on the inside but not on the outside.

BRIEF DESCRIPTION OF THE DRAWINGS

These and other aspects will now be described with reference to the accompanying drawings wherein.

The Drawings show aspects of the invention, and specifically.

DETAILED DESCRIPTION

Any of the embodiments described herein may be used together, or separate parts thereof can be used as separate embodiments.

The present application describes using an electronic system to scoop and bag pet poop.

Figure 1:
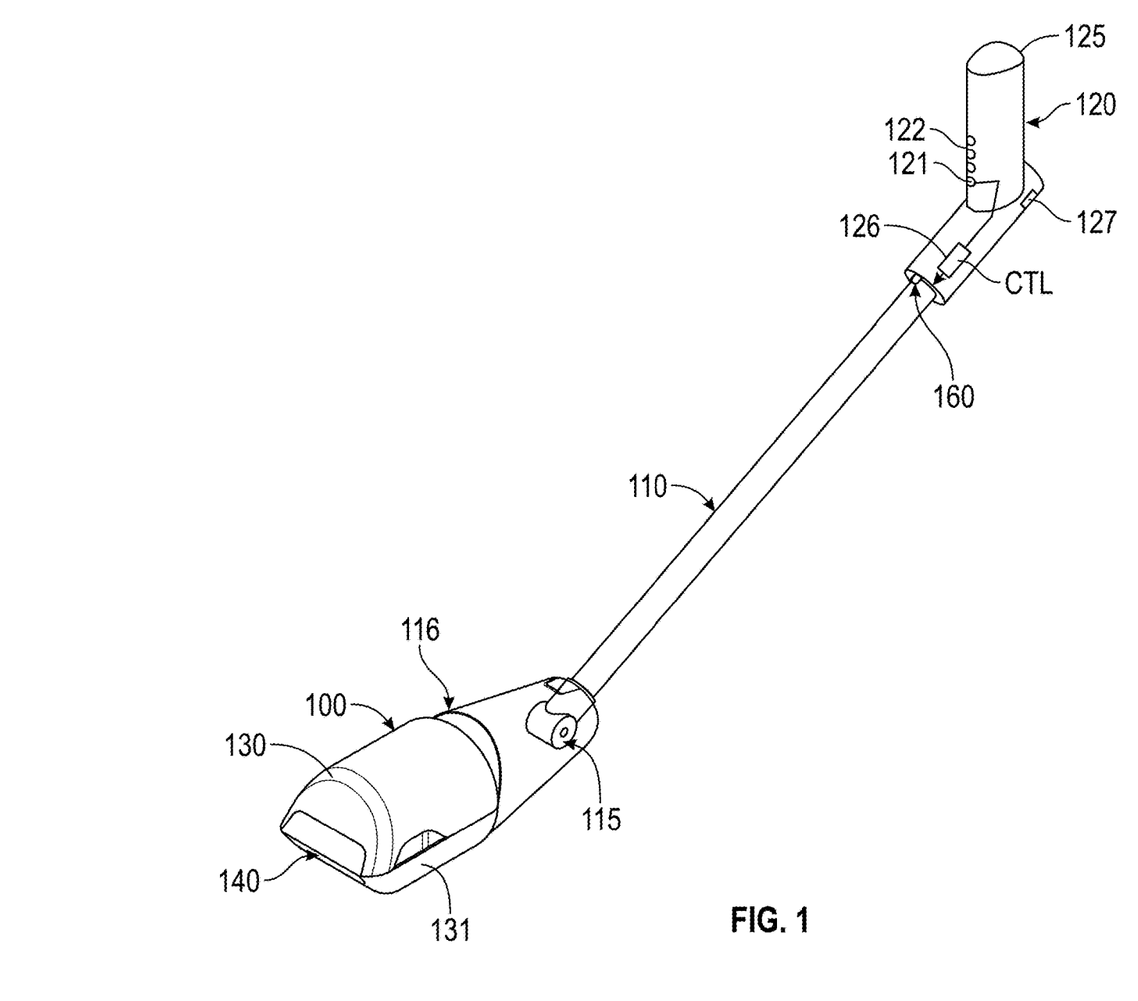
FIG. 1 shows a drawing of the poop scooper device with the jaws closed.
Figure 2:
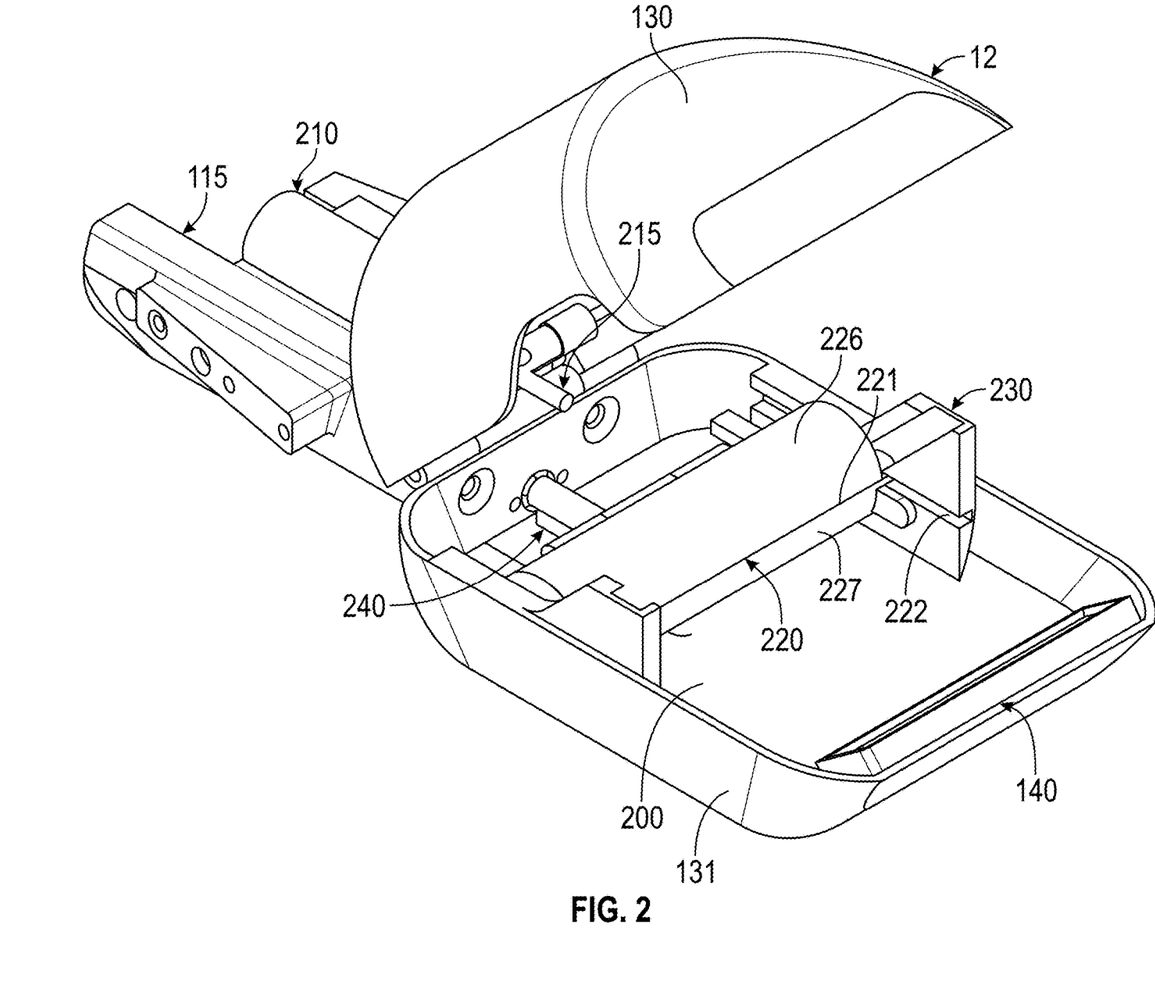
FIG. 2 shows the jaws of the poop scooper device in the open position.

The poop scooping tool is shown in FIGS. 1 and 2. An electromechanical jaw mechanism 100 is formed at one end of a telescopic handle pole 110. The telescopic handle pole 110 has parts which can be moved relative to one another in order to make the overall pole longer or shorter.

The jaw mechanism 100 is at one end of the pole 110, mounted on a pivoted connection 115 relative to the pole that allows the jaw to pivot or tilt, back and forth or up and down.

These parts allow adjustment to better adjust to the owner's height.

A handle area 120 is formed at the opposite end of the pole 110. The jaw is mounted on a swivel 101 to allow the jaw to swivel relative to the pole 110. The handle mechanism includes control buttons 121 and 122 which are used to control the device as described herein. An electronic controller 126, e.g., a microcontroller or processor, is also located in the handle, and controls the operations of the jaws as described herein.

In an embodiment, a removable and rechargeable battery pack 125 is also located on the handle, connected via an internal wired connection to power the circuits and motors to operate the jaw mechanism 100.

The Jaw mechanism includes a top jaw part 130 and a bottom jaw part 131 which move relative to one another to cause the jaw to open as shown in FIG. 2, and close as shown in FIG. 1. A motor operates to open and close the jaws. A motor shroud is shown in FIG. 1 as 116, covering the motor. The front part of the jaws includes a heat seal mechanism 140 which operates as described herein to seal the bag as needed.

FIG. 2 shows the jaws in the open position, where the bottom jaw 131 and the top jaw 130 have been opened relative to one another to expose the inner cavity 200 inside the jaws. In an embodiment, only the top jaw 130 is movable, the top jaw opening in order to expose the inside cavity 200, where the bags are located.

The motors 210 can be rotating motors which rotate a drive screw 215 which opens the top part 130 of the jaws.

A bag holder 220 holds a roll of bags therein. The bag holder 220 includes an opening 221 at the front, through which a bag, from the roll, is released. This opening 221 can be changed in size by the motor moving the bag roller forwards and backwards. The opening 221 is shown in its minimal position in FIG. 2, and in its open position in FIG. 3.

The roll of bags can be inserted and removed into the device on a bag holder track 230. Alternatively, the roll of bags can be rolled with no track, and just being a cylindrical roll that unrolls.

In operation, the two jaw parts 130, 131 can open and close relative to one another by appropriate actuation of an electromagnetic actuator. When closed, the two parts form a complementary shape that forms the interior cavity 200. The portion of any bag that is inside the cavity and adjacent the heat sealer 140 can be sealed by the heat.

In operation, the jaws are driven to open by the rotation of the electric motor 210 which rotates the drive screw 215 which opens the top portion 130 of the jaws. The jaws are open fully wide.

Figure 3:
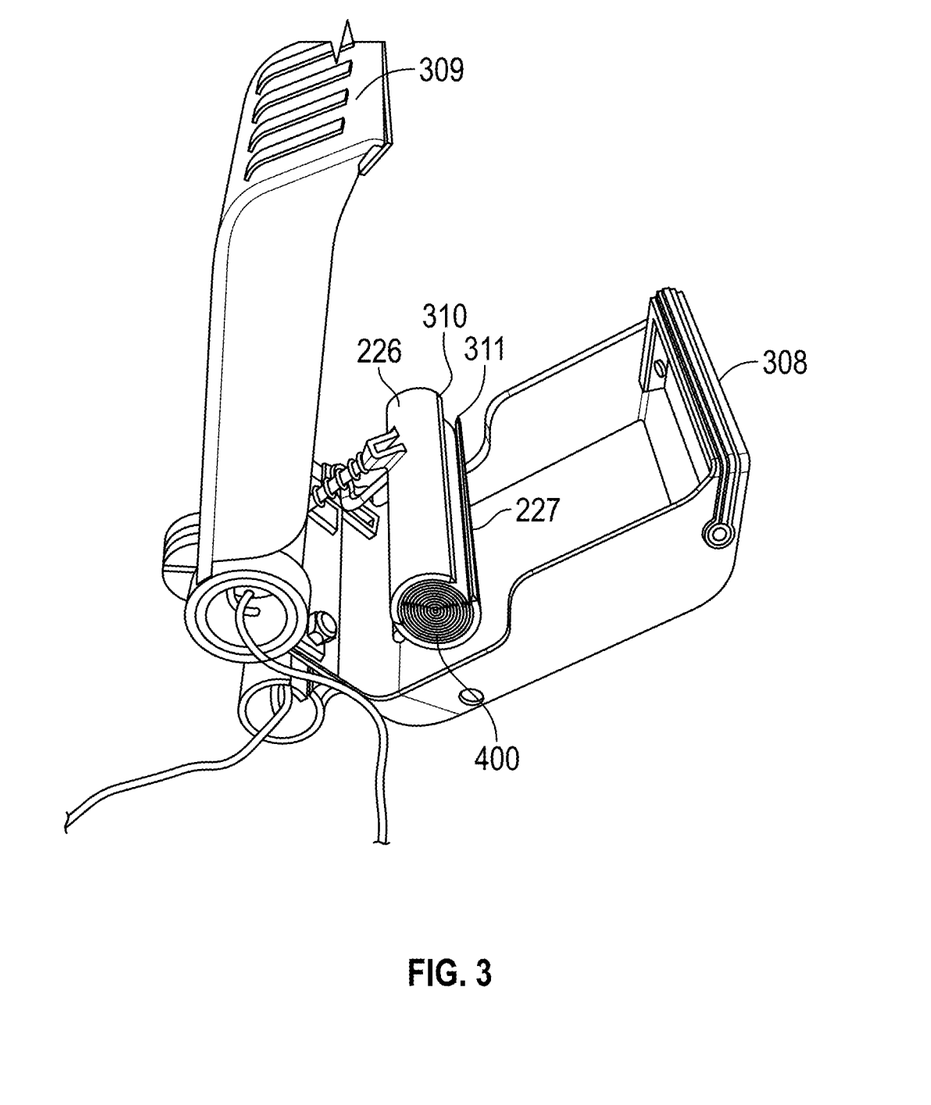
FIG. 3 shows the jaws open, and shows how the bag dispensing device is opened to allow a bag to be dispensed.

This exposes the bag dispenser 220 that is on the inside of the jaws. FIG. 3 illustrates how the bag dispenser can be pushed forward by the motor, to cause the top portion 226 of the bag dispenser to separate from the bottom portion 227 of the bag dispenser. The edge portions 310, 311 of the top and bottom portions of the bag dispenser are formed with cutting parts such as blades on their lip edges, such that when they close completely, they cut the bag in the roll at the portion when those lip portions close over the extended bag. The roll of bags 400 which is inside the bag dispenser is thus exposed in this way and a portion within the roll of bags is allowed to be removed, and then is cut when the lips are closed.

Figure 4:
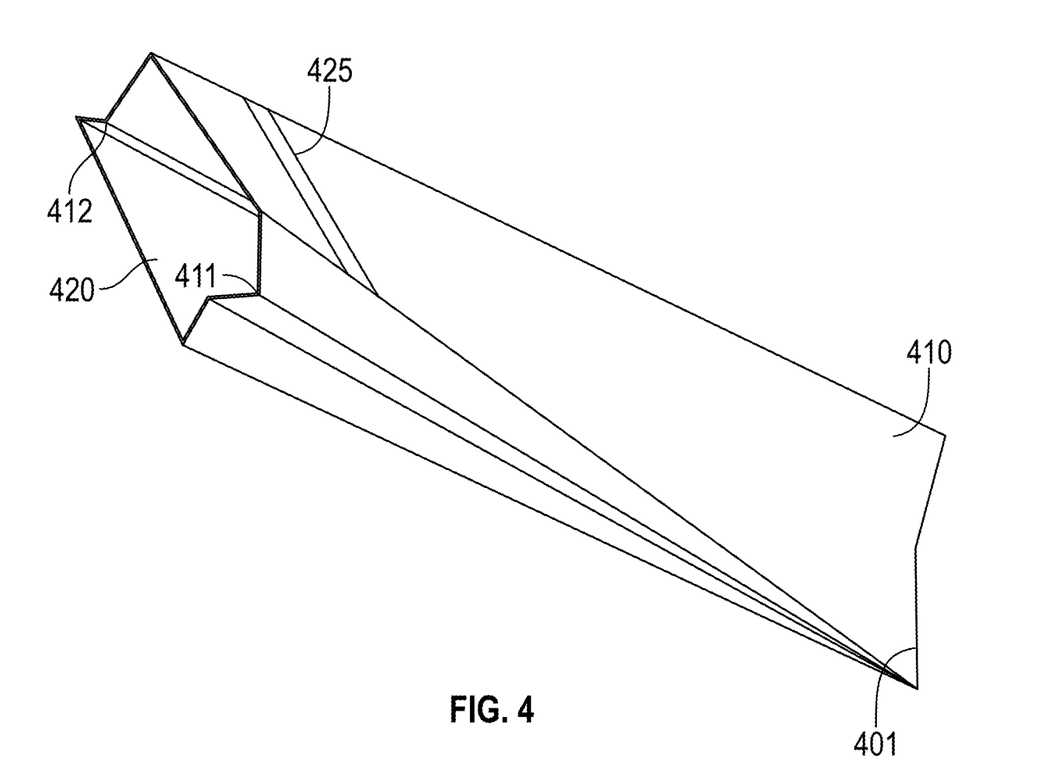
FIG. 4 shows the bag wrapped around the outside of the scooper device to prepare for the poop scooping.

A bag is unrolled from the bag dispenser, pulled out toward the jaws, and the mouth of the bag is wrapped over the lips 308, 309 of the jaws. The bag can be "gusetted" as shown in FIG. 4. FIG. 4 shows how the bags is closed at the first end 401, and has an opening 420 at the second end. The bag has gussets 411, 412, basically folds, at its two edges near the opening. The bag(s) are also imprinted with a stop line 425, which is where the heat sealing preferably occurs.

The bags are 8 inches long (to the stop line), and 23 inches in circumference. The bags are 4 inches wide, thus forming a 4 inch wide bag roll. The bag dispenser can seal and cut the tube at any point thus making a custom bag by heat sealing the front and the back of each new separate bag. In an embodiment, the cutter, is a guillotine style cutter, but other types of cutters can be used At this point, the jaws are lowered over the waste with the jaws open. The bag is covering the edges of the jaws and the inner cavity of the jaws is open and covered by the bag.

The jaws are then closed electrically using the motor, which closes the jaws, as covered with the bag, and where the waste is inside the cavity in the bag.

After the jaws are closed, the heat seal 140 is energized, which fuses closed the mouth 420 of the bag 410 at the stop line 425.

In this way, the waste is sealed inside the bag and all of it is still inside the inner cavity.

In an embodiment, the jaws can then be opened a small amount, for example ½ to 1 inch.

At this point, the bag is electromagnetically drawn into the jaws, using the bag dispenser to which the bag is still connected. The jaws are then reclosed, and the heat seal is then reenergized to fuse the bag at a second location. This provides a double seal, and a spaced double seal of the waste material into the bag. All of this is done by the controller, as described herein.

In an embodiment, two 12 V motors are located in the jaws. A first motor is a 500 RPM motor that opens and closes the jaws. A second motor, a 400 RPM operates the bag dispenser. In another embodiment, the motor for the jaws is 400 RPM and for the bag dispenser is 800 RPM. In an embodiment, the batteries are a rechargeable 3.7 V battery pack.

The buttons on the handle can cause different sequences as described herein. Each button can cause the manual operation, where a first button can open the jaws; a second button can close the jaws, and a third button can carry out heat sealing. However in a more preferred embodiment, the controller operates according to the flowchart of FIG. 5 when a button is pressed to carry out all these operations in sequence.

Figure 5:
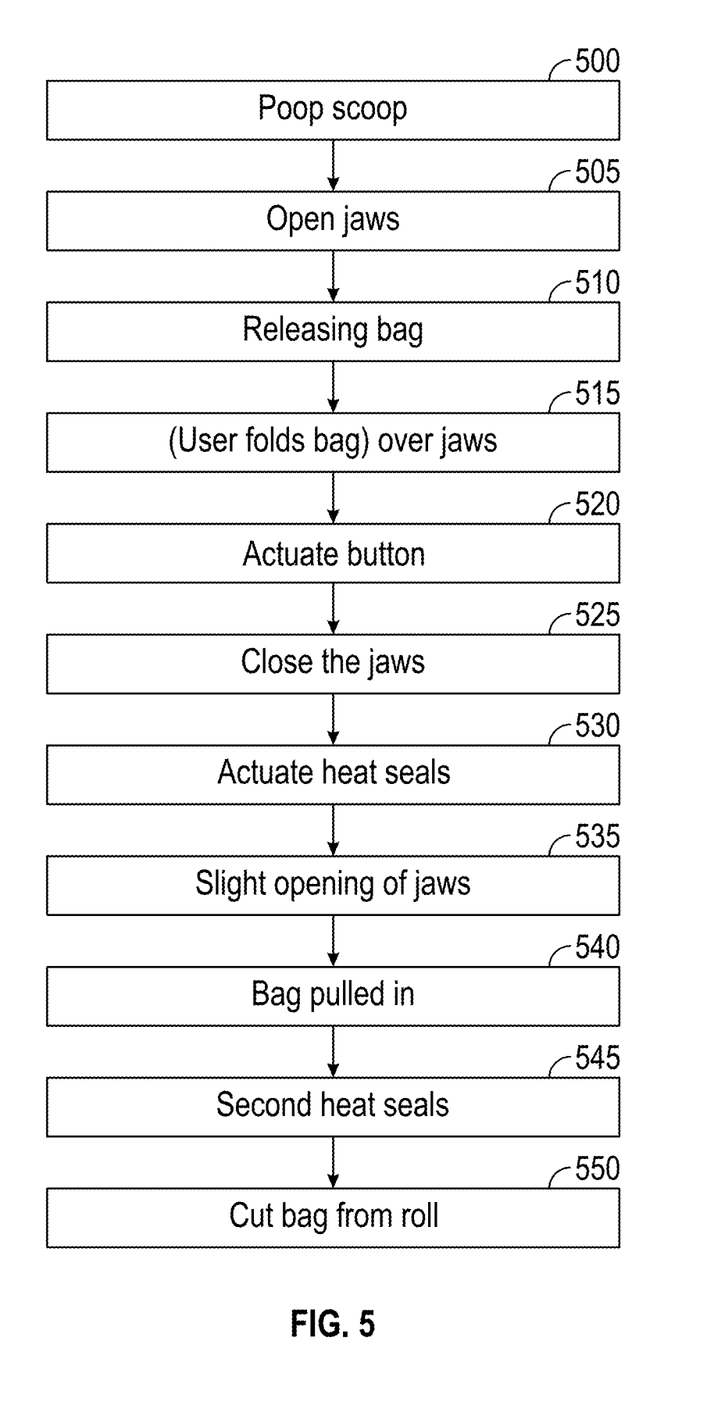
FIG. 5 shows a flowchart of operation of the processing device in an automatic mode.

The button press causes a beginning of a poop scooping operation at 500. The poop scooper operation starts by opening the jaws, and at 505 and releasing the bag by opening the bag dispenser at 510.

At this point, the user must get involved by pulling out the bag and folding it over the jaws at 515, to create the bag over jaws configuration of the bag.

Once the user has folded the bag over the jaws, the user actuates a button again at 520, to cause the poop scooping operation. At 525, the jaws are closed, to close the bag around the poop. 530 actuates the heat sealer. This causes the bag, now closed around the poop, to be sealed.

At 535, after the heat sealing has occurred there is a slight opening of the jaws followed at 540 by the bag being pulled in by a small amount for example ½ inch or less.

After the bag has been pulled in, at 545, a second heat sealing operation is carried out. This concludes the operation and now the user has two double heat sealed poop bag. The bag dispenser is then fully closed at 550, to cut the bag from the roll.

In different embodiments, timers and sensors can be used to improve the operation. In an embodiment, there is a sensor 240 on the jaws, that limits the closing of the jaws by sensing the closed position of the jaws. This prevents the motor from over closing the jaws, by sensing when the jaws are sufficiently shut.

In another embodiment, no sensors are used, and all timing, delays, amount of bag dispenser opening and jaws openness/closedness, amount of time to heat seal is coded in the software for the microcontroller.

Another embodiment limits the amount of time of the heat seal. Once the heat seal is started, the heat seal is an electromagnetic mechanically timed to seal the sealable bag. This can be timed differently for different bags, but typically causes the sealing of about 1 second.

In an embodiment, there are LED lights 160 at the front of the handle. This can also be equipped with a dog leash just below the handle.

In an embodiment, there is a USB port 127 in the handle to enable recharging the battery. In another embodiment, the USB port is in or near the jaws.

An embodiment, the connecting pole telescopes between 1 foot and 3 feet, with the wires inside In an embodiment, there can be four buttons on the handle, which control the operations in the sequencing. Pressing Button C allows loading of the bags. This allows jaws and bag dispenser to fully open for the purpose of loading the roll of bags into the bag dispenser. There is a 10-15 second delay to allow the loading. After that 10-15 second delay, the bag dispenser and jaws fully close.

The user then presses Button A which allows positioning of the bag around the jaws and in the cavity to the position shown in FIG. 4. The bag dispenser opens up a little, preferably just enough to allow the bag to be pulled through and around the jaws. This is now in the ready position for scooping the poop. The bag dispenser is fully closed.

The bag is placed over the poop, and the user presses Button B when jaws are over the poop. This causes jaws to close the process of the heat sealing 2×. Jaws are then fully closed, bag dispenser is fully closed.

Press Button C-Blades cut the perforated connection of the bags, bag dispenser stays fully shut, jaws open all the way to allow the full poop bag to drop out.

Jaws are then ready to have the next bag positioned around the jaws for the next application.

Figure 6:
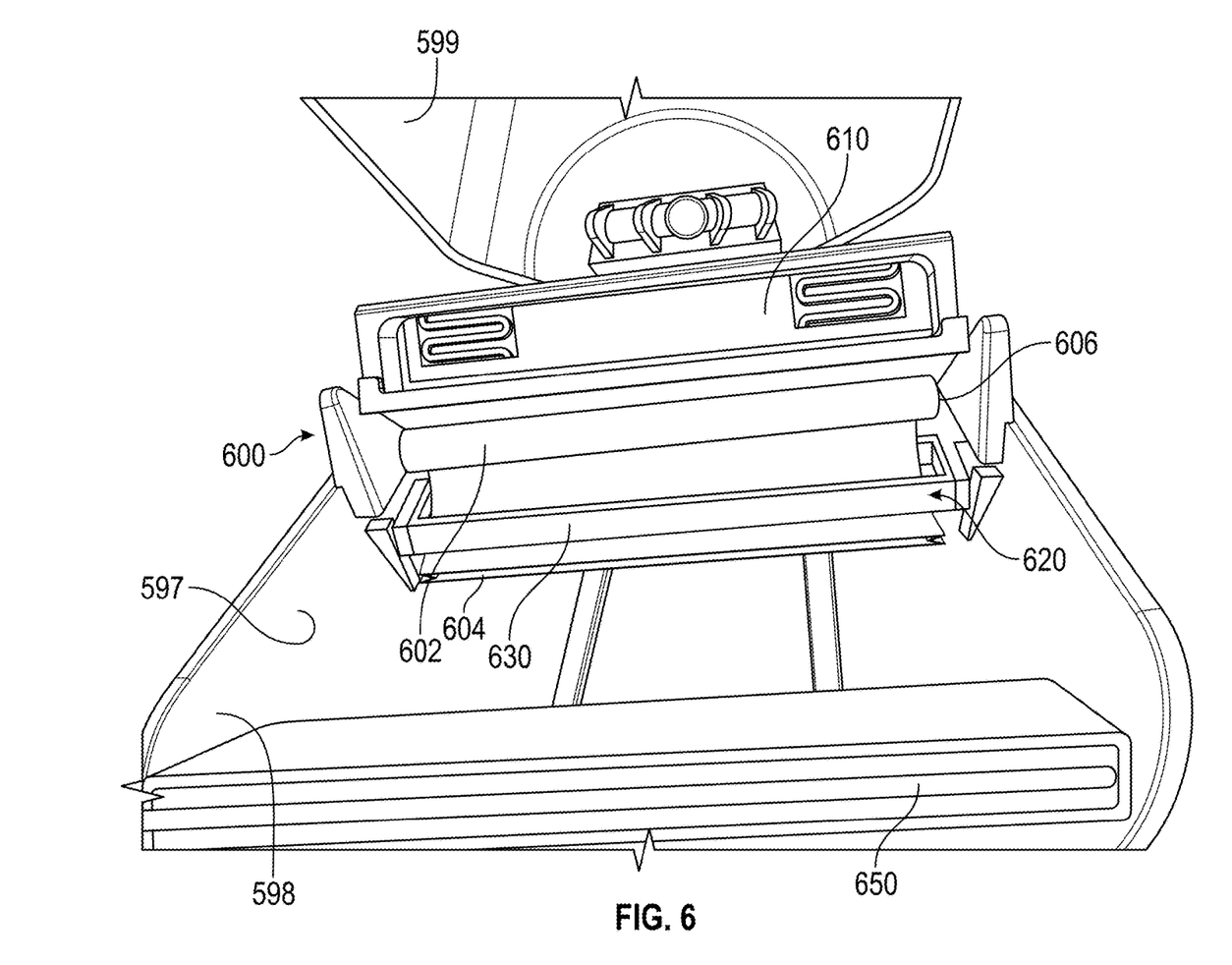
FIG. 6 shows an improvement bag dispenser with the dispenser part in its open position.

FIG. 6 shows an alternative embodiment with an improvement bag dispenser having new functions and using a new bag design.

The bag dispenser 600 is shown in FIG. 6 inside the internal cavity 597 that is formed between the two jaw parts 598 and 599.

The bag dispenser 600 includes a roll 602 of bags which can be unrolled as shown as 604, to dispense the bags according to the present application, and as in other embodiments, to allow the user to unroll these bags and place them over the outside of the open jaws 598, 599.

The bags as used in 600 can be gusseted bags, that are rolled, and opened to form an interior space within which the waste material can be contained once heat sealed.

The jaws in FIG. 6 are shown in the open position, showing the roll of bags 602 inside the bag cavity 606.

Figure 7:
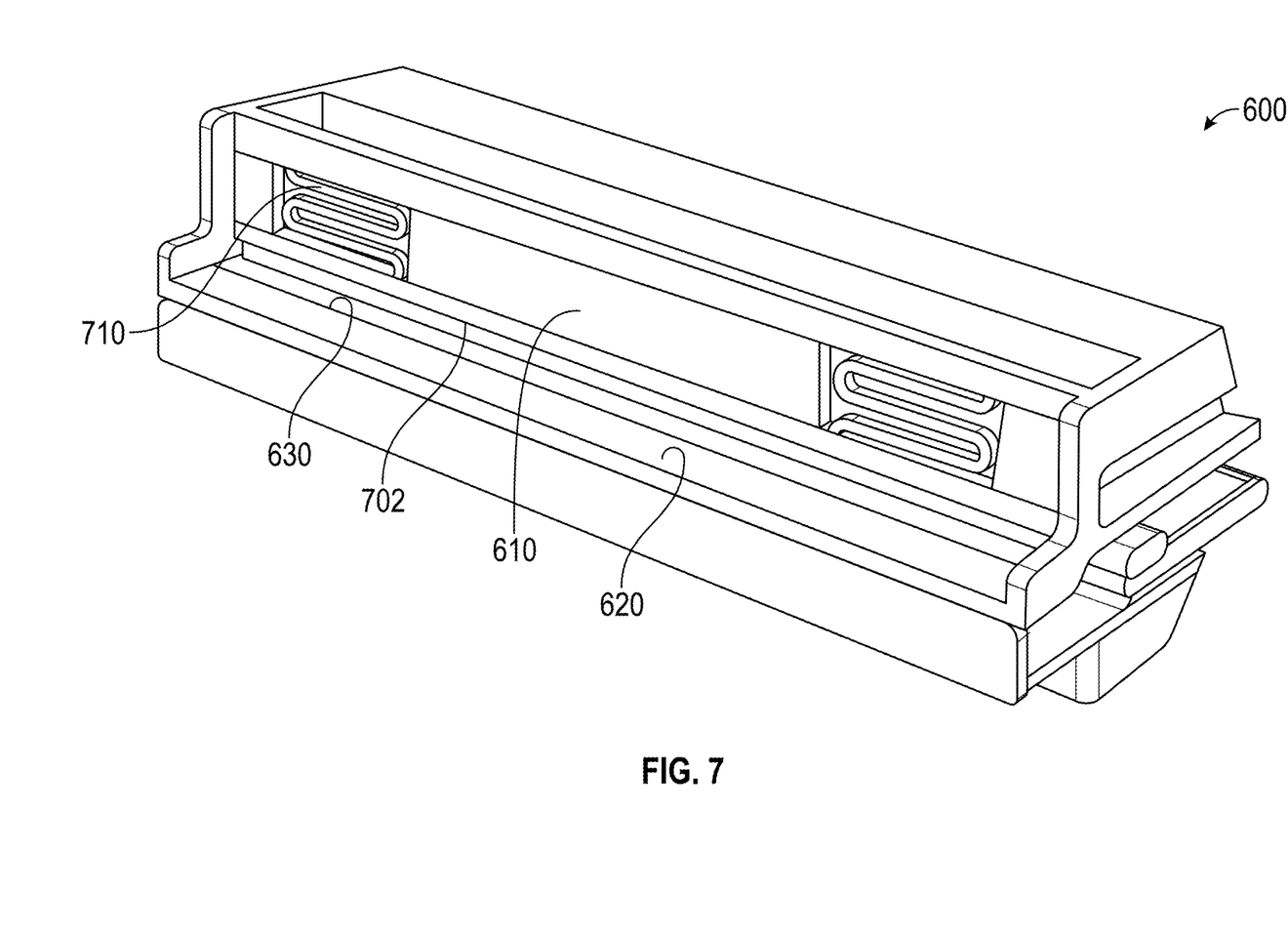
FIG. 7 shows the improvement dispenser with the dispenser part in the closed position.

The jaws are subsequently closed as shown in FIG. 7, where the top portion 610 of the bag dispenser is closed against the bottom portion 620 of the bag dispenser. As shown in FIG. 7, when the top portion 610 closes against the bottom portion 620, the bag that is extending out from the bag dispenser 600 is trapped between the top portion 610 and the bottom portion 620. The top portion 610 of the bag dispenser includes cutting blades 700 to which cut the bag that extends through that portion under control of the processor.

When closed, the S Springs 710 press the top portion 610 against the bottom portion 620, to form pressure against the bag.

At this point, the cutting blades can be actuated, to cut the bag at its location. There is also a heat seal strip 630 which can seal the bag at the rear portion closest to the bag dispenser.

This is addition in addition to the front seal strip 650 which seals the opposite side of the bag.

In operation, a roll of folded gusseted bags is used with the gussets shown in FIG. 6. The bags are gusseted at their edges so that they can open at the gussets, to show a folded bag with an open interior In operation, the buttons are used to operate the system in a way that allows loading the bag and using the bag.

Figure 8:
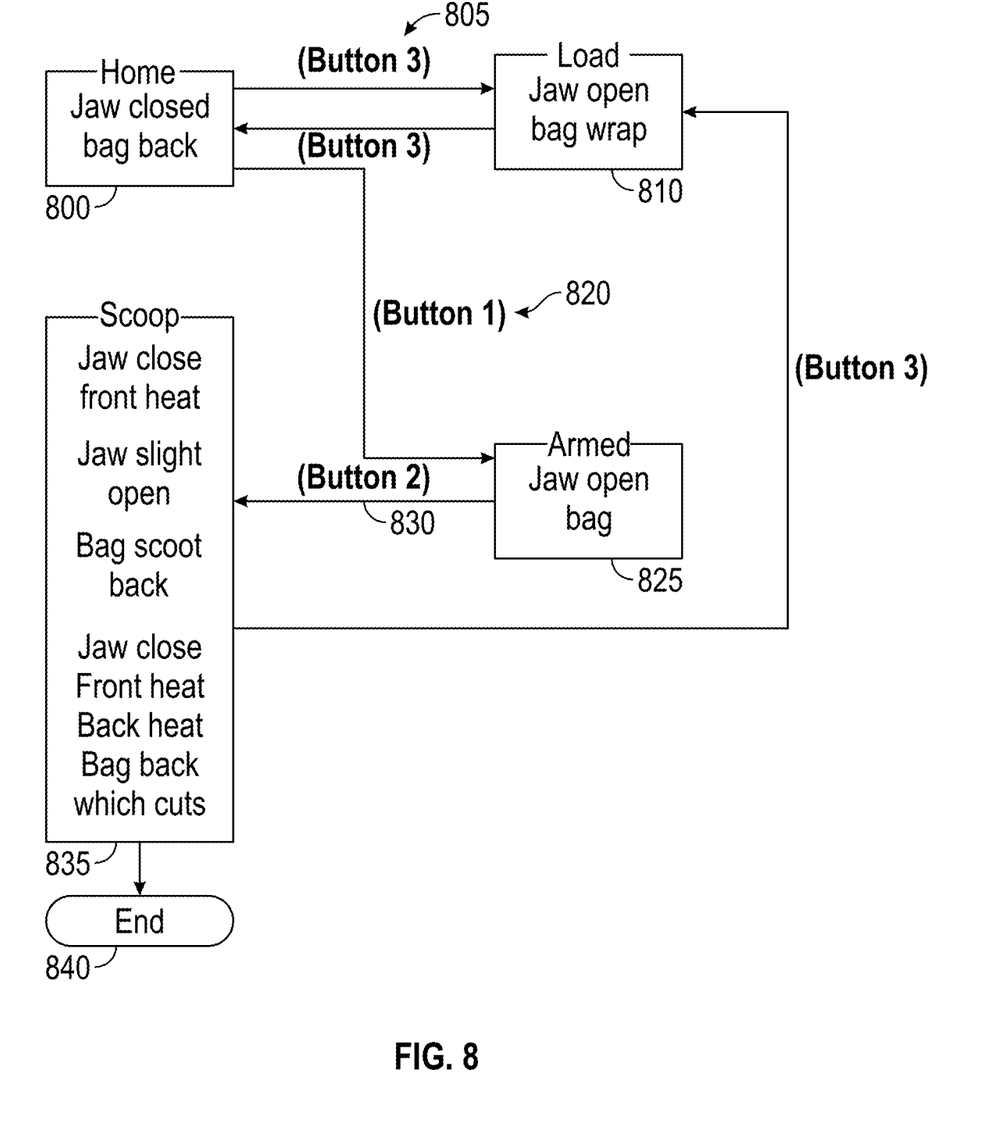
FIG. 8 shows a flowchart of operation of using the improved bag dispenser of this improvement bag dispenser and scooper.

The flowchart of FIG. 8 shows and explains an embodiment of operating using these buttons, however it should be understood that the specific button use for any function can be changed. Some of the functions that are described herein are carried out under control of the processor and others are manually carried out.

The system initiates with the jaws in their home state at 800 with the door closed and the bag back. The user then presses button three at 805 to initiate the load sequence at 810, where the jaw is opened all the way, so that the user can reach the bag. the bag dispenser moves forward and opens a little bit. The user pulls out a first bag and positions that bag around the outside of the jaws, ready for use. The jaws are now ready for scooping with the bag wrapped around the mouth of the main jaws.

The user can then initiate the scooping sequence at 820 by pressing button one. At 825, this arms the system, opening the jaws, so that the bag is also opened. The user then places the bag around the scoop material, and presses button 2 at 830 to cause the sealing operation, where the jaw closes, a front heat operation is carried out, the jaw slightly opens, the bag scoots back a little, the jaw closes again, another front heat operation is carried out then a back heat operation is carried out and then the bag back which cuts is carried out. This completes the operation at 840, releasing the cut and double sealed bag.

Then the jaws close all the way, to the home position where they are ready to carry out a new scooping operation.

All of the controlled parts described throughout the specification are controlled by motors that are controlled under control of the processor, or by manual button operations.

As described above, the system operates by the bag being pulled by a user over the jaws. The bag is sealed after the excrement has been scooped. In operation, it was found during testing that when using the embodiment of FIG. 2, that there could be corners or edge portions of the bag that extended beyond the edges of the jaws, and hence were not properly sealed by a front only sealing unit. This is believed to be because when the bag is pulled over the outside of the jaws, some parts of the bag could extend over the side portions of the jaw.

Figure 9:
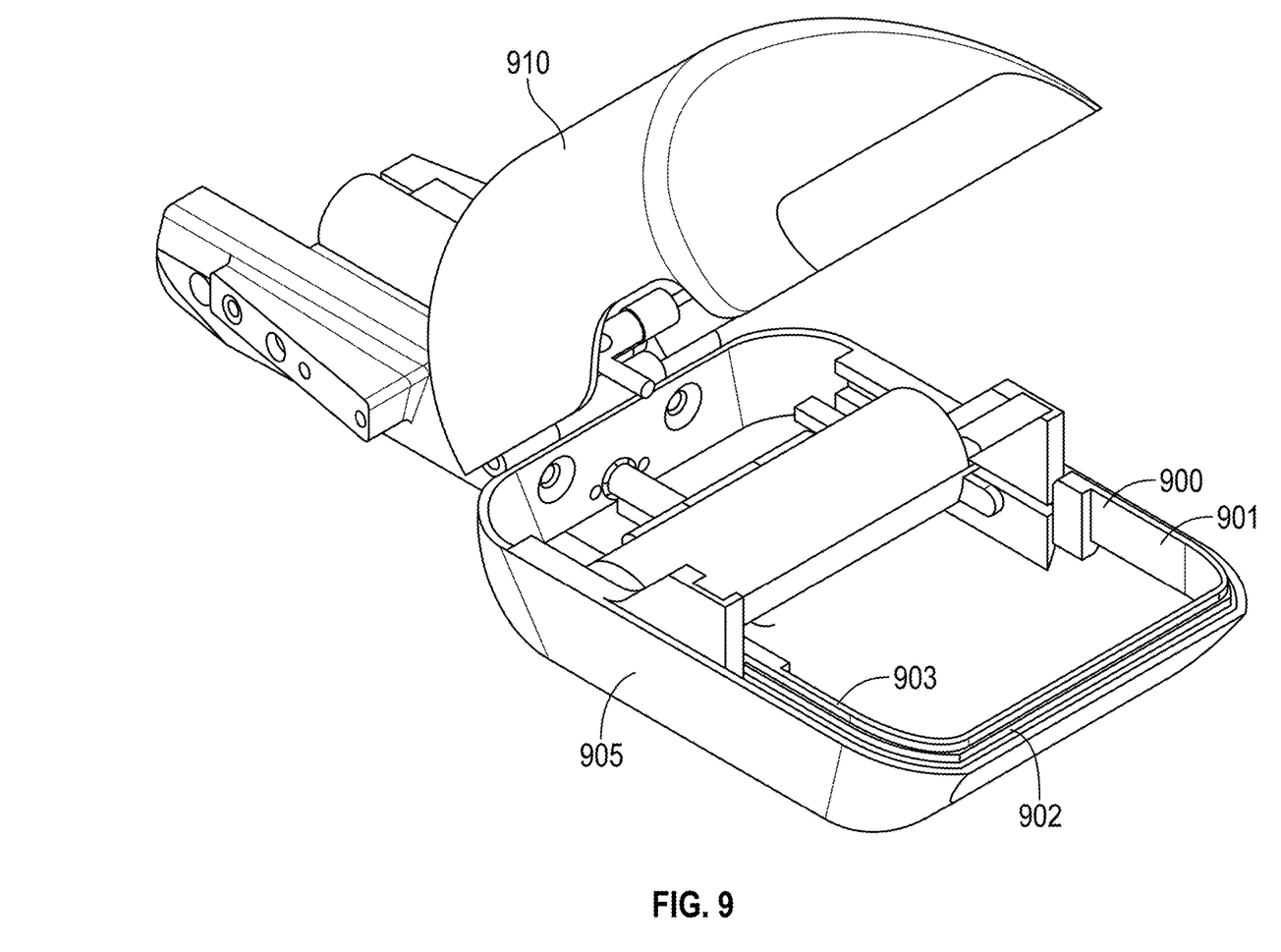
FIG. 9 shows an alternative embodiment with an expanded size of bag sealer.

An alternative embodiment shown in FIG. 9 addresses this issue, by extending the sealing portion 900 to go in a complete U-shape, completely around the complete bottom edge of the bottom jaw 905. The top jaw 910 still presses against the bottom jaw, but the heat sealing section forms a U-shape. This includes a heat sealing section 901 on a first side, the front heat sealing section 902 and the side heat sealing section 903. By doing this, the heat sealing strip seals any parts of the bag which may be extending outside the side portions 901 or 903 of the jaws, thus sealing portions that the front only heat sealing sections did not properly and completely seal.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A pet excrement scooping device, comprising:
    a handle assembly;
    a jaws device, connected to the handle assembly, the jaws device having first and second jaw parts which are controlled to open and close, forming an inner cavity between the first and second jaw parts, and the jaws hinging at a first end of the jaws, and separating and coming together at a second end of the jaws;
    a bag dispensing part, inside the inner cavity between the first jaw and second jaw parts, adapted for holding a roll of bags that can be released from the bag dispensing part;
    the bag dispensing part including a first heat sealing device, which seals the bags that are dispensed in a first location adjacent the bag dispensing part;
    the bag dispensing part also includes a cutting device, for cutting the bags in a location adjacent the first heat sealing device;
    a second heat sealing device, spaced from the first heat sealing device; and
    a processor, which controls the jaws device to open in order to obtain a bag, and to close in order to scoop waste material into the bag, and to seal the bag at the first location and a spaced-apart second location using the first heat sealing device and the second heat sealing device.

2. The device as in claim 1, the jaws device having the second heat sealing device at the second end.

3. The device as in claim 2, wherein the processor controls automatically opening and closing the jaws, and sealing the bag at the first and the second locations.

4. The device as in claim 3, wherein the processor controls an automatic bag sealing operation of closing the jaws, sealing the bag, slightly opening the jaws and moving the bag to a third location relative to the jaws, and re-closing the jaws and sealing the bag in the third location, different than the first location.

5. The device as in claim 2, wherein the processor controls the first and second heat sealing devices to seal the bag twice in two different locations, and also controls the second heat sealing device to seal the bag at a third location spaced from the first location.

6. The device as in claim 1, wherein the processor automatically controls the jaws to open and close and controls the bag dispenser to cut and release the bag.

7. The device as in claim 1, wherein the processor operates to:
open the bag dispensing part to allow the bag to be pulled over the bag dispensing part and over an outside of the jaws;
then open the jaws to allow scooping waste material;
then close the jaws to capture the waste material; and
heat seal the waste material inside the bag at the first location adjacent the bag dispensing part and at the second location adjacent the front of the jaws.

8. The device as in claim 7, further comprising the processor operating to first seal the bag near the bag dispenser, then move the bag to seal the bag at a second time near the bag dispenser and also seal the bag at the second location adjacent the front of the jaws.

9. The device as in claim 1, wherein the jaws form a U-shape, wherein the second heat sealing device is a front heat sealing device, and the front heat sealing device is along a complete U-shaped section of one of the jaws.

10. A method of operating a pet excrement scooping device, comprising:
using controls on a handle assembly to control a jaws device connected to the handle assembly, the jaws device having first and second jaw parts which are controlled to open and close, forming an inner cavity between the first and second jaws part, the jaws hinging at a first end of the jaws, and separating and coming together at a second end of the jaws;
the device including a bag dispensing part inside the inner cavity between the first jaw part and the second jaw part, adapted for holding a roll of bags that can be released from the bag dispensing part;
the bag dispensing part including:
a first heat sealing device, which seals the bags that are dispensed in a first location adjacent the bag dispensing part;
a cutting device for cutting the bags in a location adjacent the bag sealing part; and
a second heat sealing device spaced from the first heat sealing device;
the device further including a processor and controlling operations; and
using the processor, to control the jaws device to open in order to obtain a bag;
using the processor to open the bag dispensing part to allow the bag to be pulled over an outside of the jaws;
after waste material has been scooped into the bag, using the processor to close the jaws to capture the waste material and to heat seal the waste material inside the bag at the first location adjacent the bag dispensing part and at a second location adjacent the front of the jaws; and
after sealing the bag, using the processor to open the jaws to remove the bag.

11. The method as in claim 10, wherein the processor controls the operation to form first and second spaced-apart seals on the bag at a first side of the bag.

12. The method as in claim 11, wherein the heat seal operates to seal both a front and a side of the bag.

\* \* \* \* \*